(12) United States Patent
Odell et al.

(10) Patent No.: US 7,683,102 B2
(45) Date of Patent: Mar. 23, 2010

(54) VEHICLES FOR INK COMPOSITIONS

(75) Inventors: Peter G. Odell, Mississauga (CA);
Jennifer Lynne Belelie, Oakville (CA);
Raymond W. Wong, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 223 days.

(21) Appl. No.: 11/451,342

(22) Filed: Jun. 13, 2006

(65) Prior Publication Data

US 2007/0254978 A1 Nov. 1, 2007

Related U.S. Application Data

(60) Provisional application No. 60/745,945, filed on Apr. 28, 2006.

(51) Int. Cl.
*C08F 2/46* (2006.01)
*G01D 11/00* (2006.01)
*G09D 10/00* (2006.01)

(52) U.S. Cl. .......................... 522/1; 347/99; 106/31.29; 106/31.61

(58) Field of Classification Search .................. 522/1; 347/99; 106/31.29, 31.61
See application file for complete search history.

(56) References Cited

U.S. PATENT DOCUMENTS

| | | | |
|---|---|---|---|
| 4,490,731 A | 12/1984 | Vaught | |
| 4,538,156 A | 8/1985 | Durkee et al. | |
| 5,190,978 A * | 3/1993 | Nakamura et al. | 514/738 |
| 5,372,852 A | 12/1994 | Titterington et al. | |
| 5,476,540 A | 12/1995 | Shields et al. | |
| 5,496,879 A | 3/1996 | Griebel et al. | |
| 5,531,817 A | 7/1996 | Shields et al. | |
| 5,554,212 A | 9/1996 | Bui et al. | |
| 5,672,297 A * | 9/1997 | Soane | 252/511 |
| 6,121,358 A * | 9/2000 | Dershem et al. | 524/439 |
| 6,467,897 B1 | 10/2002 | Wu | |
| 6,547,380 B2 | 4/2003 | Smith et al. | |
| 2003/0092820 A1 | 5/2003 | Schmidt | |
| 2004/0024078 A1* | 2/2004 | Itoh et al. | 522/1 |
| 2004/0132862 A1 | 7/2004 | Woudenberg | |
| 2007/0255038 A1 | 11/2007 | Odell et al. | |

FOREIGN PATENT DOCUMENTS

| | | |
|---|---|---|
| DE | 42 05 636 A1 | 8/1993 |
| DE | 42 05 713 A1 | 8/1993 |
| EP | 1 375 569 A1 | 1/2004 |
| EP | 1 616 921 A1 | 1/2006 |
| GB | 2 336 594 A | 10/1999 |
| WO | WO 97/25389 * | 7/1997 |

OTHER PUBLICATIONS

U.S. Appl. No. 11/289,609, filed Nov. 30, 2005, to Peter G. Odell et al.
U.S. Appl. No. 11/289,573, filed Nov. 30, 2005, to Gregory J. Kovacs et al.
U.S. Appl. No. 11/289,605, filed Nov. 30, 2005, to Gregory J. Kovacs et al.
U.S. Appl. No. 11/289,521, filed Nov. 30, 2005, to Jennifer L. Belelie et al.
U.S. Appl. No. 11/289,615, filed Nov. 30, 2005, to Jennifer L. Belelie et al.
U.S. Appl. No. 11/289,552, filed Nov. 30, 2005, to Jennifer L. Belelie et al.
U.S. Appl. No. 11/289,620, filed Nov. 30, 2005, to Peter G. Odell et al.
U.S. Appl. No. 11/289,375, filed Nov. 30, 2005, to Daryl W. Vanbesien et al.
U.S. Appl. No. 11/289,473, filed Nov. 30, 2005, to Rina Carlini et al.
U.S. Appl. No. 11/136,525, filed May 25, 2005, to Jennifer L. Belelie et al.
Co-pending U.S. Appl. No. 11/034,850, filed Jan. 14, 2005, to Peter G. Odell et al.
Co-pending U.S. Appl. No. 11/034,856, filed Jan. 14, 2005, to Peter G. Odell et al.
Co-pending U.S. Appl. No. 11/034,714, filed Jan. 14, 2005, to Jennifer L. Belelie et al.
Co-pending U.S. Appl. No. 11/018,378, filed Dec. 22, 2004, to Peter G. Odell et al.
Co-pending U.S. Appl. No. 11/034,866, filed Jan. 14, 2005, to Marcel P. Breton et al.

* cited by examiner

*Primary Examiner*—Mark Eashoo
*Assistant Examiner*—Jessica Paul
(74) *Attorney, Agent, or Firm*—Oliff & Berridge, PLC

(57) ABSTRACT

Vehicles for ink compositions are disclosed. The described ink vehicles include at least one curable component, and optionally include initiating agents, colorants, non-curable components and other additives. Processes for preparing the ink vehicles and ink compositions containing the ink vehicles are also described.

18 Claims, No Drawings

VEHICLES FOR INK COMPOSITIONS

This application claims the benefit of U.S. Provisional Application No. 60/745,945 filed Apr. 28, 2006.

TECHNICAL FIELD

This disclosure is directed to vehicles for ink-jettable ink compositions. In particular, ink-jettable ink compositions including vehicles may be cured to provide robust images. Also described are methods for preparing such vehicles and ink compositions, as well as image recording methods using such ink-jettable ink compositions to form robust images.

RELATED APPLICATIONS

Commonly assigned U.S. patent application Ser. No. 11/289,609, filed Nov. 30, 2005, to Peter G. Odell et al., describes a radiation curable phase change ink comprising an ink vehicle that includes a curable gellant comprised of a curable polyamide-epoxy acrylate component and a polyamide component, and at least one colorant.

Commonly assigned U.S. patent application Ser. No. 11/289,573, filed Nov. 30, 2005, to Gregory J. Kovacs et al., describes a pre-treatment composition comprising: one or more organic liquids chosen from the group consisting of $C_6$-$C_{30}$ linear alkanes, $C_6$-$C_{30}$ branched alkanes, $C_6$-$C_{30}$ linear alkenes and $C_6$-$C_{30}$ branched alkenes, and mixtures thereof; and one or more cross-linking initiators chosen from the group consisting of peroxy compounds and azo compounds.

Commonly assigned U.S. patent application Ser. No. 11/289,605, filed Nov. 30, 2005, to Gregory J. Kovacs et al., describes an ink-jettable overcoat composition for providing high-gloss, high-quality, and durable images, comprising: one or more organic liquids chosen from the group consisting of $C_6$-$C_{30}$ linear alkanes, $C_6$-$C_{30}$ branched alkanes, $C_6$-$C_{30}$ linear alkenes and $C_6$-$C_{30}$ branched alkenes, and mixtures thereof; and one or more film-forming materials.

Commonly assigned U.S. patent application Ser. No. 11/289,521, filed Nov. 30, 2005, to Jennifer L. Belelie et al., describes a composition, comprising: (a) curable monomer; (b) at least one photoinitiator that initiates polymerization of the curable monomer; and (c) phase change agent that provides the composition with an increase in viscosity of at least four orders of magnitude, from a first temperature, the first temperature being from 50° C. to 130° C., to a second temperature, the second temperature being from 0° C. to 70° C., wherein the second temperature is at least 10° C. below the first temperature.

Commonly assigned U.S. patent application Ser. No. 11/289,615, filed Nov. 30, 2005, to Jennifer L. Belelie et al., describes a radiation curable ink comprising curable monomer that is liquid at 25° C., curable wax, and colorant.

Commonly assigned U.S. patent application Ser. No. 11/289,552, filed Nov. 30, 2005, to Jennifer L. Belelie et al., describes an ink jettable overprint composition, comprising: at least one of a polymerizable monomer and/or a polymerizable oligomer; at least one photoinitiator; and at least one wax.

Commonly assigned U.S. patent application Ser. No. 11/289,620, filed Nov. 30, 2005, to Peter G. Odell et al., describes a phase change ink having a viscosity of from about 4 mPa·s to about 50 mPa·s at a first temperature and having a viscosity of from $10^4$ mPa·s to about $10^9$ mPa·s at a second temperature, the second temperature being below the first temperature by at least 10° C., but by no more than 50° C.

Commonly assigned U.S. patent application Ser. No. 11/289,375, filed Nov. 30, 2005, to Daryl W. Vanbesien et al., describes a toner composition comprising toner particles, the toner particles comprising: (i) polymer comprising photoinitiator and (ii) unsaturated curable resin.

Commonly assigned U.S. patent application Ser. No. 11/289,473, filed Nov. 30, 2005, to Rina Carlini et al., describes a radiation curable phase change ink comprising an ink vehicle that includes at least one gellant comprising a curable epoxy-polyamide composite gellant and at least one colorant.

Commonly assigned U.S. patent application Ser. No. 11/136,525, filed May 25, 2005, to Jennifer L. Belelie et al., describes a radiation curable phase change ink comprising an ink vehicle that includes at least one gellant comprising a curable epoxy-polyamide composite gellant and at least one colorant.

Commonly assigned U.S. patent application Publication No. 2007/0255038 describes a process for preparing long-chain $AB_2$ diacrylate compounds, comprising: reacting an $AB_2$ monomer and an acryloyl halide to form an $AB_2$ diacrylate; and reacting the $AB_2$ diacrylate and an aliphatic, long-chain, mono-functional alkane to form a long-chain $AB_2$ diacrylate compound.

Other curable inks that that are described to achieve more robust images following curing have also been described. Reference is made to the following patent properties: (1) Co-pending application Ser. No. 11/034,850, filed Jan. 14, 2005; (2) Co-pending application Ser. No. 11/034,856, filed Jan. 14, 2005; (3) Co-pending application Ser. No. 11/034,714, filed Jan. 14, 2005; (4) Co-pending application Ser. No. 11/018,378, filed Dec. 22, 2004; and (5) Co-pending application Ser. No. 11/034,866, filed Jan. 14, 2005.

The appropriate components and process aspects of each of the foregoing, such as the ink composition components and imaging processes, may be selected for the present disclosure in embodiments thereof. The entire disclosures of the above-mentioned applications are totally incorporated herein by reference.

REFERENCES

U.S. Pat. No. 5,531,817 discloses a thermal ink-jet ink having the following composition: (a) a color bleed control agent selected from the group consisting of (1) about 0.05 to 2 wt % of a high molecular weight polymer having a molecular weight of at least 10,000 and (2) about 15 to 45 wt % of an amine oxide surfactant; (b) about 0.5 to about 20 wt % of at least one low vapor pressure solvent; (c) at least one water-soluble dye; and (f) the balance water, wherein the thermal ink-jet ink is a gel at ambient temperatures and is adapted to be heated as necessary to achieve a temperature such that the thermal ink-jet ink has a viscosity within the range of 1.2 to 12 cP immediately prior to jetting the thermal ink-jet ink from an ink-jet pen.

U.S. Pat. No. 5,476,540 discloses a method for printing multi-color images on a print medium in which color bleed between adjacent colored regions is controlled comprising the steps of: (a) providing two compositions, a first composition comprising a gel-forming species and a second composition comprising a gel-initiating species which is capable of reacting with the first composition in order to form a gel therefrom, provided that at least one of the two compositions includes at least one coloring agent; (b) applying the first composition to the print medium in a first region thereon; (c) applying the second composition to the print medium in a second region thereon, the second region being directly adjacent to and in contact with the first region; and (d) allowing the gel-initiating species in the second composition to react with the gel-forming species in the first composition at a position on the print medium where the first region comes in contact with the second region so that the gel is formed at the position in order to prevent color bleed between the first composition in the first region and the second composition in the second region.

U.S. Pat. No. 5,554,212 discloses an aqueous phase change ink composition, comprising: a coloring agent; a water dispersible polyester gloss agent; and an amount of hyperthermogelling component in a concentration such that the ink composition is in a liquid state at a first temperature and is in a solid state at a second temperature where the second temperature is greater than the first temperature.

U.S. Pat. No. 6,547,380 discloses a process which comprises (a) incorporating into an ink jet printing apparatus (1) a color forming composition comprising a liquid vehicle and at least one color forming agent; and (2) a reacting composition comprising a liquid vehicle and at least one material capable of reacting with the color forming agent to cause a desired color to form; (b) causing droplets of the color forming composition to be ejected in an imagewise pattern onto the substrate; and (c) causing droplets of the reacting composition to be ejected in an imagewise pattern onto the substrate; wherein the process results in at least some portions of the substrate bearing images comprising both the color forming composition and the reacting composition, the portions forming a printed image, wherein droplets of the color forming composition and droplets of the reacting composition are applied to the substrate in an imagewise pattern so that droplets of color forming composition and reacting composition overlap in a controlled pattern, wherein an amount of overlap of the color forming composition and the reacting composition is varied, thereby forming spots of varying sizes on the substrate, the spots being formed in areas where droplets of the color forming composition and reacting composition overlap.

U.S. Pat. No. 4,490,731 discloses an apparatus for dispensing ink which is a solid at 25° C. from a reservoir onto a recording media, the apparatus comprising: a feed tube having an entrance in contact with the ink in the reservoir; a nozzle coupled to the feed tube; and a resistance heater for melting the ink, the resistance heater extending from the reservoir through the feed tube to the nozzle.

U.S. Pat. No. 5,372,852 discloses a process for indirectly applying a phase change ink composition to a substrate, which comprises a. combining a phase change ink colorant composition and a modified phase change ink carder composition to produce the phase change ink composition having fluidic and mechanical properties which meet the parameters needed for indirect application thereof; b. raising the temperature of the phase change ink composition to a first operating temperature to form a liquid phase change ink composition; c. providing a liquid intermediate transfer means at a second operating temperature for indirectly applying the phase change ink composition to the substrate; d. applying droplets of the phase change ink composition to the liquid intermediate transfer means in a pattern and in a liquid phase; e. forming the pattern of the phase change ink composition in a solid phase on the liquid intermediate transfer means at the second operating temperature; f. transferring the phase change ink composition from the liquid intermediate transfer means to the substrate; and g. fixing the phase change ink composition to the substrate to form a printed substrate, the phase change ink composition having (1) a compressive yield strength which will allow it to be malleable to spread and deform without an increase in stress when compressive forces are applied thereto at the second operating temperature, and sufficient internal cohesive strength to avoid shear banding and weak behavior when the phase change ink composition is transferred and fixed to the substrate, and (2) a ductility on the substrate after the fixing.

U.S. Pat. No. 5,496,879 discloses a printing ink consisting essentially of: a solid solventless ink such that the ink is printable in a fused fluid condition having a ready-to-print viscosity for a gravure printing method after addition of heat, and the ink being solidifiable by heat extraction after having been printed onto imprinting material; the ink including an optional colorant and a binding agent having at least two component groups, each component group including at least one member, the members of the first component group having solvent character for the members of the second component group; wherein the members of the first component group are present as solid phase crystalline materials at ambient temperatures; wherein the members of the second component group which are polymers are present as viterous, amorphous materials in solid phase at ambient temperature, which are soluble in the molten members of the first component group, and precipitate at a temperature above the melting point of the members of the first component group; and wherein upon heat extraction, the members of the first component group are dissolved as a solid solution in the members of the second component group when these are precipitating from the fused fluid condition. German-language Patent Publications DE 42 05 636 A1 and DE 42 05 713 A1 likewise disclose phase-change inks in other printing technologies, including gravure printing.

U.S. Pat. No. 4,538,156 discloses an ink jet page printer comprising: a source of ink; one or more print heads each comprising a plurality of jets and a corresponding plurality of actuators responsive to electrical signals for selectively projecting droplets of ink; a transfer medium having a moving surface thereof adjacent to but spaced apart from the print head for receiving the projected droplets; circuitry for generating the electrical signals for controlling the print heads to create patterns of droplets of ink on the moving surface the circuitry comprising a memory for storing indicia representative of patterns of droplets of ink to be projected on the moving surface, a means for writing indicia into the memory in response to received input signals, a means for reading indicia from the memory and means for controlling the printing heads in accordance with the indicia read from the memory; an arrangement for selectively transferring the droplet patterns from the transfer medium surface to a printing medium, the arrangement comprising a printing medium support surface and a printing pressure roller assembly for pressing a printing medium supported on the support surface into line contact with the transfer medium surface when enabled, and means for selectively enabling the printing pressure roller assembly; a printing medium feed assembly for storing a plurality of sheets of printing medium and for moving the sheets one at a time to the printing medium support surface in timed sequence with the operation of the printing pressure roller assembly; means coordinated with the movement of the moving surface for generating control signals for the circuitry the means coordinated with the movement of the transfer medium moving surface comprising a timing track containing optically or magnetically discernible indicia disposed on the surface and means for generating control signals in response to the discernible indicia; lateral motion means for controlling moving the print heads in a first direction transverse to the direction of travel of the transfer medium moving surface; means for controlling the lateral motion means to move the print heads in coordination with the movement of the transfer medium such that each ink jet successively serves the tracks of a plurality of adjacent parallel tracks on the transfer surface; means for controlling the lateral motion means to move the print heads in a direction opposite to the first transverse direction so as to position the ink jet over the first track of its plurality of tracks; and an arrangement for cleaning the transfer medium surface after the droplet patterns have transferred from the transfer medium surface to the printing medium, the arrangement including a roller for pressing a cleaning medium into contact with the transfer medium surface when enabled, and means for selectively enabling the cleaning arrangement.

The disclosures of each of the foregoing patents and publications are hereby incorporated by reference herein in their entireties. The appropriate components and process aspects of the each of the foregoing patents and publications may also be selected for the present compositions and processes in embodiments thereof.

BACKGROUND

Thermal ink-jet printing processes employ inks that are solid at room temperature and liquid at elevated temperatures. Such ink compositions include ink vehicles chosen to have a melting point above room temperature so that the ink compositions, which are melted in the apparatus, will not be subject to evaporation or spillage during periods of non-printing. The vehicles also possess low critical temperatures that permit the use of the solid ink in a thermal ink-jet printer. In thermal, or hot-melt, ink-jet printing processes employing these phase-change inks, the solid ink is melted by a heater in the printing apparatus and used as a liquid in a manner similar to that of conventional piezoelectric or thermal ink-jet printing. Upon contact with the printing substrate, the molten ink solidifies rapidly, enabling the dye to remain on the surface. Because the dye is not carried into the substrate by capillary action, higher print density than is generally obtained with liquid inks can be achieved.

Phase-change inks are desirable for ink-jet printers because they remain in a solid phase at room temperature during shipping, long-term storage, and the like. In addition, the problems associated with nozzle clogging as a result of ink evaporation with liquid ink-jet inks are largely eliminated, thereby improving the reliability of the ink-jet printing. Further, in phase-change ink-jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Hot-melt inks typically used with ink-jet printers have a wax-based ink vehicle, e.g., a crystalline wax. Such solid ink-jet inks provide vivid color images. In typical systems, these crystalline wax inks partially cool on an intermediate-transfer member and are then pressed into the image receiving medium such as paper. Transfuse spreads the image droplet, providing a richer color and lower pile height. The low flow of the solid ink also prevents show-through on the paper.

In these systems, the crystalline-wax inks are jetted onto a transfer member, for example, an aluminum drum, at temperatures of approximately 130 to 140° C. The wax-based inks are heated to such high temperatures to decrease their viscosity for efficient and proper jetting onto the transfer member. The transfer member is at approximately 60° C., so that the wax will cool sufficiently to solidify or crystallize. As the transfer member rolls over the recording medium, e.g., paper, the image comprised of wax-based ink is pressed into the paper. The images produced with inks composed of crystalline waxes are visually appealing; however, lowering the temperature at which the inks are jetted and improving the robustness of the printed images would be beneficial.

However, the brittle waxes used in inks such as those described above do not provide robust images and are easily scratched. Low viscosity, inks, such as those curable by ultraviolet (UV) radiation, provide a printing option that is both jettable and curable to robust image on paper. These inks lack the thermally driven change in viscosity of hot-melt inks required to successfully transfuse the image as well as prevent image show-through on paper. In addition, a UV-curable resin removes the requirement for a hard-wax ink vehicle. The resin can be cured to a tougher material than could ever be found with a wax. However, the transfuse drum makes use of the post-jetting solidification of the wax to preserve dot integrity during image build up and transfer.

The preponderance of functionalized materials useful for UV curing are difunctional. Multifunctionality insures that the desired cross-linked network will be achieved. In the dominantly used class, acrylates, three major classes exist: polyethers, polyesters, and polyurethanes. All contain oxygen and/or nitrogen in the backbone. Only the polyethers which are built up from ethylene and propylene glycols have the ability to be of sufficiently low viscosity to be the major component of jettable inks. There are very few long hydrocarbon-chain acrylate-monofunctional monomers and no commercial examples of a difunctional acrylate with long hydrocarbon chains.

While hot-melt ink compositions are used successfully, a need remains for phase-change ink compositions that are suitable for hot-melt ink-jet printing processes, such as piezoelectric ink-jet printing processes and the like. There is still a need for ink compositions that can be processed at lower temperatures and with lower energy consumption, and a need for inks that have improved robustness and printing latitude. There is also a need for ink compositions that have improved jetting reliability and latitude with respect to meeting both the jetting and transfuse requirements of curable aqueous and non-aqueous inks. In addition, a need remains for phase-change ink compositions that exhibit desirably low viscosity values at jetting temperatures. Additionally, a need remains for phase-change ink compositions that generate images with improved look and feel characteristics. Additionally, there is a need for phase-change ink compositions that generate images with improved hardness and toughness characteristics. A need also remains for phase-change ink compositions that are suitable for high speed printing, thereby enabling transaction and production printing applications. In addition, there remains a need for curable ink compositions for piezoelectric ink-jet printing that produce a stable image that can be transferred to a substrate without cracking and hardened upon cure.

SUMMARY

The present disclosure addresses these and other needs, by providing phase-change ink compositions that exhibit low viscosities at jetting temperatures and provide robust images This disclosure also includes methods for preparing and using such ink compositions.

In particular, embodiments provide ink composition comprising a homogeneous ink vehicle that comprises one or more curable components, wherein the curable components are chosen from molecules including two reactive functional groups and one or more long aliphatic hydrocarbon chains. The ink vehicles of embodiments may further comprise one or more of non-curable components, colorants, initiators, and other optional additives.

Exemplary methods for preparing ink compositions are provided. These methods include heating to melt and dissolve one or more curable components chosen from molecules including two reactive functional groups and one or more long aliphatic hydrocarbon chains; optionally dissolving one or more initiating agents and/or colorants in the melted curable component; optionally dissolving one or more additives in the melted curable component mixture; optionally agitating the mixture; optionally dissolving one or more non-curable components in the mixture; and cooling to yield a solid ink composition.

These and other features and advantages of various exemplary embodiments of materials, devices, systems and/or methods are described in or are apparent from, the following detailed description.

Embodiments

This disclosure is not limited to particular embodiments described herein, and some components and processes may be varied by one of skill, based on this disclosure. The terminology used herein is for the purpose of describing particular embodiments only, and is not intended to be limiting.

In this specification and the claims that follow, singular forms such as "a," "an," and "the" include plural forms unless the content clearly dictates otherwise. In addition, reference may be made to a number of terms that shall be defined as follows:

The term "organic molecule" refers, for example, to any molecule that is made up predominantly of carbon and hydrogen, such as, for example, alkanes and arylamines. The term "heteroatom" refers, for example, to any atom other than carbon and hydrogen. Typical heteroatoms included in organic molecules include oxygen, nitrogen, sulfur and the like.

The term "saturated" refers, for example, to compounds containing only single bonds. The term "unsaturated" refers, for example, to compounds that contain one or more double bonds and/or one or more triple bonds.

The term "long-chain" refers, for example, to hydrocarbon chains in which n is a number of from about 8 to about 60, such as from about 20 to about 45 or from about 30 to about 40. The term "short-chain" refers, for example, to hydrocarbon chains in which n is a number of from about 1 to about 7, such as from about 2 to about 5 or from about 3 to about 4.

The term "alkyl" refers, for example, to a branched or unbranched saturated hydrocarbon group, derived from an alkane and having the general formula $C_nH_{2n+1}$, in which n is a number of 1 or more, such as of from about 1 to about 60. Exemplary alkyl groups include methyl, ethyl, n-propyl, isopropyl, n-butyl, isobutyl, tert-butyl, octyl, decyl, tetradecyl, hexadecyl, eicosyl, tetracosyl and the like. The term "lower alkyl" refers, for example, to an alkyl group of from about 1 to about 12 carbon atoms. "Halogenated alkyl" refers, for example, to an alkyl group in which at least one hydrogen atom, and optionally all hydrogen atoms, is replaced by a halogen atom.

The term "alkylene" refers, for example, to a branched or unbranched saturated hydrocarbon group of about 1 to about 12 carbon atoms and having two bonds to other portions of the molecule. Exemplary alkylene groups have the structure $-(CH_2)_a-$, in which a is an integer in a range of from about 1 to about 12.

"Alcohol" refers, for example, to an alkyl moiety in which one or more of the hydrogen atoms has been replaced by an —OH group. The term "lower alcohol" refers, for example, to an alkyl group of about 1 to about 6 carbon atoms in which at least one, and optionally all, of the hydrogen atoms has been replaced by an —OH group. The term "primary alcohol" refers, for example to alcohols in which the —OH group is bonded to a terminal or chain-ending carbon atom, such as in methanol, ethanol, 1-propanol, 1-butanol, 1-hexanol and the like. The term "secondary alcohol" refers, for example to alcohols in which the —OH group is bonded to a carbon atom that is bonded to one hydrogen atom and to two other carbon atoms, such as in 2-propanol (isopropanol), 2-butanol, 2-hexanol and the like. The term "tertiary alcohol" refers, for example to alcohols in which the —OH group is bonded to a carbon atom that is bonded to three other carbon atoms, such as in methylpropanol (tert-butanol) and the like.

"Diol" refers, for example, to an alkyl moiety in which two of the hydrogen atoms have been replaced by —OH groups.

The term "derivative" refers, for example, to compounds that are derived from another compound and maintain the same general structure as the compound from which they are derived. For example, saturated alcohols and saturated amines are derivatives of alkanes.

The term "dimer" refers, for example, to compounds formed by the combination of two identical monomer molecules.

"Carbonyl compound" refers, for example, to an organic compound containing a carbonyl group, C=O, such as, for example, aldehydes, which have the general formula RCOH; ketones, which have the general formula RCOR'; carboxylic acids, which have the general formula RCOOH; and esters, which have the general formula RCOOR'.

The term "alkoxy" refers, for example, to an alkyl group bound through a single, terminal ether linkage; that is, an "alkoxy" group is defined as —OR in which R is an alkyl as defined above. A "lower alkoxy" refers, for example, to an alkoxy group containing 1 to about 6 carbon atoms.

The term "$AB_2$ monomer" refers, for example, to monomers that contain two different functional groups, A and B, in a ratio of 1 A group to 2 B groups.

The terms "standard temperature" and "standard pressure" refer, for example, to the standard conditions used as a basis where properties vary with temperature and/or pressure. Standard temperature is 0° C.; standard pressure is 101,325 Pa or 760.0 mmHg. The term "room temperature" refers, for example, to temperatures in a range of from about 20° C. to about 25° C.

"Optional" or "optionally" refer, for example, to instances in which subsequently described circumstance may or may not occur, and include instances in which the circumstance occurs and instances in which the circumstance does not occur.

The terms "one or more" and "at least one" refer, for example, to instances in which one of the subsequently described circumstances occurs, and to instances in which more than one of the subsequently described circumstances occurs. Similarly, the terms "two or more" and "at least two" refer, for example to instances in which two of the subsequently described circumstances occurs, and to instances in which more than two of the subsequently described circumstances occurs.

In embodiments, "soluble" refers, for example, to the specified material being substantially soluble in the respective solvent, although complete (100%) solubility is not necessarily required. Likewise, in embodiments, "insoluble" refers, for example, to the specified material being substantially insoluble in the respective solvent, although complete (100%) insolubility is not necessarily required.

Exemplary ink compositions provide superior print quality while meeting requirements of piezoelectric ink-jet printing processes. In particular, exemplary ink compositions comprise an ink vehicle that comprises one or more curable components. Exemplary methods of preparing such ink compositions and exemplary methods of using such ink compositions are also described.

The ink vehicles of embodiments may be mixtures of curable components and, optionally, additional materials including initiating agents, colorants, non-curable components, as well as any optional additives.

The one or more curable components of embodiments include two reactive functionalities and one or more long aliphatic hydrocarbon chains in the same molecule, but are not otherwise particularly limited. Suitable materials that may be used as the curable component include UV-curable materials, photo-curable materials, and curable materials requiring the use of an initiator compound, as well as mixtures of such materials.

In embodiments, the curable component(s) may include reactive functional groups selected from the group consisting of acrylate, methacrylate, vinyl ether, epoxy and the like. In some embodiments, the curable component(s) may be one or more compounds chosen from of acrylates, diacrylates and mixtures thereof. In particular embodiments, the curable component(s) may be one or more monomer chosen from dimer diol diacrylates and $AB_2$ acrylates. The curable component(s) may include one or more of diacrylate monomers, such as those prepared from those prepared from organic diols, diamines and diesters.

Examples of organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol and the like; dimer diols and the like; and mixtures thereof.

The curable component may include long chain $AB_2$ diacrylates. $AB_2$ diacrylates may be prepared from the reaction of $AB_2$ monomers with acryloyl halides. For example, bishydroxy alkyl carboxylic acids ($AB_2$ monomers in which A is carboxylic acid and B is hydroxyl) can be reacted with acryloyl halides to produce bisacrylate alkyl carboxylic acids, which can then be selectively condensed with long-chain aliphatic alcohols to form diacrylate esters.

Exemplary curable components may be curable by exposure to radiation. Radiation curable components may be cured by radiation having wavelengths in the range of from about 200 to about 500 nanometers, such as from about 280 to about 430 nanometers or from about 350 to about 410 nanometers. However, selection of radical curable monomers should be governed by considerations such as compatibility of the monomers with colorants; safety, particularly with respect to the volatility of oil-soluble components, as well as its skin irritancy, odor and other toxic concerns; properties of the cured image such as resistance to abrasion and cracking; high cure rates and viscosity.

A variety of UV curable materials may be used as curable components of exemplary ink compositions. For example, curable components may be chosen from oil-soluble curable components, such as one or more of polyether acrylates, polyether methacrylates, polyurethane acrylates, polyurethane methacrylates, polyester acrylates, polyester methacrylates, epoxides, cyclicaliphatic epoxides, vinyl ethers, and mixtures thereof. Multi-functional vinyl ethers may also be used. Curable components may be cationically radiation curable monomers, such as cycloaliphatic epoxides, polyfunctional cycloaliphatic epoxides, vinyl ether, and mixtures thereof. Vinyl ether compounds may participate in radical polymerizations with acrylates, in embodiments in which acrylates are present in excess with respect to vinyl ether compounds, such as in an excess of approximately 5:1. If the vinyl ether is used in higher amounts, or epoxides are used, the inclusion of a cationic initiator, in addition to a radical initiator, is necessary.

In embodiments, the curable component may be present in amounts of from about 20 to about 95 weight %, based on a total weight of the ink vehicle, such as 40 to about 92 weight % or 60 to about 90 weight %.

One or more initiating agent may be included in exemplary ink compositions for their known effects. Initiating agents that may be used include, but are not limited to, benzophenones; benzoin ethers; benzilketals; α-hydroxyalkyl-phenones; α-aminoalkylphenones; acylphosphine photoinitiators, such as those sold under the trade designations of IRGACURE and DAROCCUR, available from Ciba Specialty Chemicals, Inc.; co-initiators and amine synergists, such as isopropyl-thioxanthone, ethyl 4-(dimethylamino) benzoate, 2-ethylhexyl dimethylaminobenzoate, and the like; and cationic photoinitiators, such as sulfonium, sulfoxonium, and iodonium salts.

Initiating agents, such as photoinitiators, should be thermally stable at the operating temperatures employed. For example, the operating temperature of a piezoelectric printing head is generally in the range of from about 70° C. to about 80° C., and initiating agents included in ink compositions printed on such a head should be thermally stable at such temperatures. Thus, so-called Norrish type I initiating systems, for example 2-benzyl-2-(dimethylamino)-1-(4-(4-morphorlinyl)phenyl)-1-butanone, 2-methyl-1-(4-methylthio) phenyl-2-(4-morphorlinyl)-1-propanone, diphenyl-(2,4,6-trimethylbenzoyl) phospine oxide, phenyl bis(2,4,6-trimethylbenzoyl) phosphine oxide, 1-hydroxy-cyclohexylphenylketone, benzyl-dimethylketal, 2,4,6-trimethylbenzoylphenylphosphinic acid ethyl ester, oligo(2-hydroxy-2-methy-1-(4-(1-methylvinyl)phenyl)propanone), 2-hydroxy-2-methyl-1-phenyl-1-propanone, 1-(4-(2-hydroxyethoxy)phenyl)-2-hydroxy-2-methylpropan-1-one may be included in some exemplary ink vehicles. Norrish type II initiating systems, such as isopropyl-thioxanthone, benzophenone, 2,4,6-trimethylbenzophenone, 4-methylbenzophenone, camphorquinone and optionally amine synergists may also be used such as ethyl-4-dimethylaminobenzoate and 2-ethylhexyl-4-dimethylamino benzoate may also be used in exemplary ink vehicles. In cationic polymerization, the following sulphonium initiators, such as bis(4-(diphenyl-sulphonio)-phenyl) sulphide bis-hexafluoro-phosphate, bis (4-di(4-(2-hydroxyethyl)phenyl)sulphonio-phenyl) sulphide bis-hexafluorophosphate, bis(4-di(4-(2-hydroxyethyl)phenyl)sulphonio-phenyl) sulphide bis-hexafluoroantimonate, CYRACURE UVI-6990 from Dow Chemical, R-GEN® BF-1172 from Chitec Chemical Co. maybe used. Iodonium cationic intiators, 4-methylphenyl-(4-(2-methylpropyl) phenyl)iodonium hexafluorophosphate, may also be used; however, these systems have proven to be less thermally stable, possibly as a result of their lower oxidation potential.

In embodiments, the initiating agent may be present in amounts of from about 0 to about 15 weight %, based on a total weight of the ink vehicle, such as 1 to about 10 weight % or 3 to about 8 weight %.

Any desired or effective colorant can be employed in the ink compositions, including pigment, dye, mixtures of pigment and dye, mixtures of pigments, mixtures of dyes, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include EASTMAN olefin, USHARECT Blue 86 (Direct Blue 86), available from USH-ANTI Color; INTRALITE Turquoise 8GL (Direct Blue 86), available from Classic Dyestuffs; CHEMICTIVE Brilliant Red 7BH (Reactive Red 4), available from Chemiequip; LEVAFIX Black EB, available from Bayer; REACTRON Red H8B (Reactive Red 31), available from Atlas Dye-Chem; D&C Red #28 (Acid Red 92), available from Wamer-Jenkinson; Direct Brilliant Pink B, available from Global Colors; Acid Tartrazine, available from Metrochem Industries; CARTASOL Yellow 6GF, available from Clariant; CARTA Blue 2GL, available from Clariant; and the like. Particularly suitable are solvent dyes; within the class of solvent dyes, spirit soluble dyes are desired because of their compatibility with the ink vehicles of the present invention. Examples of suitable spirit solvent dyes include NEOZAPON Red 492 (BASF); ORASOL Red G (Ciba); Direct Brilliant Pink B (Global Colors); AIZEN SPWLON Red C-BH (Hodogaya Chemical); KAYANOL Red 3BL (Nippon Kayaku); Spirit Fast Yellow 3G; AIZEN SPWLON Yellow C-GNH (Hodogaya Chemical); CARTASOL Brilliant Yellow 4GF (Clariant); PERGASOL Yellow CGP (Ciba); ORASOL Black RLP (Ciba); SAVINYL Black RLS (Clariant); MORFAST Black Conc. A (Rohm and Haas); ORASOL Blue GN (Ciba); SAVINYL Blue GLS (Sandoz); LUXOL Fast Blue MBSN (Pylam); SEVRON Blue 5GMF (Classic Dyestuffs); BASACID Blue 750 (BASF), and the like. NEOZAPON Black X51 (C.I. Solvent Black, C.I. 12195) (BASF), Sudan Blue 670 (C.I. 61554) (BASF), Sudan Yellow 146 (C.I. 12700) (BASF), and Sudan Red 462 (C.I. 260501) (BASF) are particularly suitable in some embodiments.

Pigments are also suitable colorants for the inks. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST Blue 15:4 (Sun Chemical 249-0592); HOSTAPERM Blue B2G-D (Clariant); Permanent Red P-F7RK; HOSTAPERM Violet BL (Clariant); LITHOL Scarlet 4440 (BASF); Bon Red C (Dominion Color Company); ORACET Pink RF (Ciba); PALIOGEN Red 3871 K (BASF); SUNFAST Blue 15:3 (Sun Chemical 249-1284); PALIOGEN Red 3340 (BASF); SUNFAST Carbazole Violet 23 (Sun Chemical 246-1670); LITHOL Fast Scarlet L4300 (BASF); SUNBRITE Yellow 17 (Sun Chemical 275-0023); HELIOGEN Blue L6900, L7020 (BASF); SUNBRITE Yellow 74 (Sun Chemical 272-0558); SPECTRA PAC C Orange 16 (Sun Chemical 276-3016); HELIOGEN Blue K6902, K6910 (BASF); SUNFAST Magenta 122 (Sun Chemical 228-0013); HELIOGEN Blue D6840, D7080 (BASF); Sudan Blue OS (BASF); NEOPEN Blue FF4012 (BASF); PV Fast Blue B2G01 (Clariant); IRGALITE Blue BCA (Ciba); PALIO- Exemplary ink compositions may also include non-curable components, such as heat solvents or "thermal solvents." Suitable thermal solvents include, but are not limited to, waxy diols; paraffins; microcrystalline waxes; polyethylene waxes; ester waxes; fatty acids and other waxy materials; fatty amide containing materials; sulfonamide materials; isocyanate-derived resins and waxes, such as urethane isocyanate-derived materials, urea isocyanate-derived materials, urethane/urea isocyanate-derived materials, mixtures thereof, and the like; resinous materials made from different natural sources, for example, tall oil rosins and rosin esters; and mixtures thereof.

Exemplary thermal solvents may be selected from difunctional fatty alcohols, including the exemplary difunctional fatty alcohols set forth in Table 1; polyols having a molecular weight of less than about 20,000 grams/mole; compounds such as urea, ethyl urea, methyl sulfonamide and ethylene carbonate; tetrahydro-thiophene-1,1-dioxide; methyl anisate; polycaprolactones having softening temperatures of from about 35° C. to about 50° C., polycaprolactone-block-polytetrahydrofuran-block-polycaprolactones having a melting point of about 30° C. to about 33° C., such as TERATHANE, from DUPONT; pyridine N-oxide; acetamide; acrylamide; sulfamide; melimide; pyrazole; imidizole; and mixtures thereof Thermal solvents may be used as the non-curable component of embodiments either individually or in combination.

TABLE 1

| | Molecular Formula | Molecular Weight | Melting Point, ° C. | Boiling Point, ° C. (pressure, kPa) |
|---|---|---|---|---|
| 1,6-Hexanediol | $C_6H_{14}O_2$ | 118.17 | 42 | 134 (1.3) |
| 1,7-Heptanediol | $C_7H_{16}O_2$ | 132.20 | 18 | 151 (1.9) |
| 1,8-Octanediol | $C_8H_{18}O_2$ | 146.23 | 61 | 167-168 (2.4) |
| 1,9-Nonanediol | $C_9H_{20}O_2$ | 160.26 | 45 | 173.2 (1.9) |
| 1,10-Decanediol | $C_{10}H_{22}O_2$ | 174.29 | 73 | 175-176 (1.9) |
| 1,11-Undecanediol | $C_{11}H_{24}O_2$ | 188.31 | 63 | 178 (1.6) |
| 1,12-Dodecanediol | $C_{12}H_{26}O_2$ | 202.34 | 81 | 183-184 (1.25) |
| 1,13-Tridecanediol | $C_{13}H_{28}O_2$ | 216.37 | 75-76 | 195-197 (1.3) |
| 1,14-Tetradecanediol | $C_{14}H_{30}O_2$ | 230.39 | 85 | 200 (1.2) |
| 1,15-Pentadecanediol | $C_{16}H_{32}O_2$ | 244.42 | 70.6-71.6 | 205-207 (1.3) |
| 1,16-Hexadecanediol | $C_{16}H_{34}O_2$ | 258.45 | 91.4 | 195-200 (0.53) |
| 1,17-Heptadecanediol | $C_{18}H_{36}O_2$ | 272.48 | 96-96.5 | 204-205 (0.27) |
| 1,18-Octadecanediol | $C_{19}H_{38}O_2$ | 286.50 | 97-98 | 210-211 (0.27) |
| 1,19-Nonadecanediol | $C_{20}H_{40}O_2$ | 300.53 | 101 | 212-214 (0.2) |
| 1,20-Eicosanediol | $C_{20}H_{42}O_2$ | 314.56 | 102.4-102.6 | 215-217 (0.2) |
| 1,21-Heneicosanediol | $C_{21}H_{44}O_2$ | 328.58 | 105-105.5 | 223-224 (0.2) |
| (Z)-9-Octadecene | $C_{18}H_{36}O_2$ | 284.49 | 89 | 182/0.06 |

GEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); HANSA Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330TM (Cabot), Carbon Black 5250, Carbon Black 5750 (Columbia Chemical), mixtures thereof and the like.

The colorant can be included in the ink compositions of embodiments in any suitable amount, such as an amount of from about 0.1 to about 15% by weight of the ink composition, such as from about 0.5 to about 10% by weight of the ink composition or from about 2.5 or about 4% by weight of the ink composition.

Thermal solvents may be present in exemplary ink compositions in any desired or effective amount. Exemplary ink compositions may include thermal solvents in an amount of about 0 to about 20 weight %, based on a total weight of the ink vehicle, such as from about 5 to about 15 weight % or from about 8 to about 12 weight %.

Optional additives that may be used in ink compositions of embodiments include, but are not limited to dispersents and/or surfactants, conductivity enhancing agents, tackifiers, adhesives, plasticizers, nonpolymeric organic gelator additives, viscosity modifiers, clarifiers, defoamers, antifoamers, leveling agents, additives for roll release and lubricity, and the like, and mixtures thereof.

Exemplary ink compositions may include one or more dispersants and/or one or more surfactants for their known properties, such as controlling wetting properties of the ink composition, and stabilizing colorants. Examples of suitable additives that may be used in embodiments include, but are not limited to, BYK-UV 3500, BYK-UV 3510 (BYK-Chemie); DOW CORNING 18, 27, 57, 67 Additives; ZONYL FSO 100 (DuPont); MODAFLOW 2100 (Solutia); FOAM BLAST 20F, 30, 550 (Lubrizol); EFKA-1101, -4046, -4047, -2025, -2035, -2040, -2021, -3600, -3232; SOLSPERSE 19200, 20000, 34750, 36000, 39000, 41000, 54000, individual dispersants or combinations may optionally be used with synergists including SOLSPERSE 5000, 12000, 22000 (Lubrizol); DISPERBYK-108, -163, -167, -182 (BYK-Chemie); K-SPERSE 132, XD-A503, XD-A505 (King Industries).

Exemplary ink compositions may also optionally contain one or more antioxidants, for the known properties of antioxidants, such as protecting the images from oxidation and protecting components of ink compositions from oxidation during the heating portion of ink preparation and usage processes. Suitable antioxidants that may be used include, but are not limited to, 2,6-di-tert-butyl-4-methoxyphenol, 2,4-di-tert-butyl-6-(4-methoxybenzyl) phenol, 4-bromo-2,6-dimethylphenol, 4-bromo-3,5-didimethylphenol, 4-bromo-2-nitrophenol, 4-(diethyl aminomethyl)-2,5-dimethyl-phenol, 3-dimethylaminophenol, 2-amino-4-tert-amylphenol, 2,6-bis(hydroxymethyl)-p-cresol, 2,2'-methylenediphenol, 5-diethylamino)-2-nitrosophenol, antimony dialkyl phosphorodithioate, molybdenum oxysulfide dithiocarbamate, (nickel-bis(o-ethyl(3,5-di-tert-butyl-4-hydroxybenzyl) phosphonate, 4,4'-methylene-bis(dibutyldithio-carbamate), tetrasodium-N-(1,2-dicarboxyethyl)-N-octadecyl sulfosuccinamate, IRGASTAB UV 10 (Ciba), 2,6-di-tert-butyl-a-dimethylamino-4-cresol, 2,2'-isobutylidene-bis(4,6-dimethyl phenol), 2,2'-methylenebis(6-tert-butyl-4-methylphenol), 2,2'-methylenebis(6-tert-butyl-4-ethylphenol), N-isopropyl-N'-phenyl-phenylene diamine, N-(1,3-dimethylbutyl)-N'-phenyl-phenylene-diamine, N,N'-di(2-octyl)-4-phenylene diamine, N,N'-bis(1,4-dimethylpentyl)-4-phenylene diamine, 2,4,6-tris-(N-1,4-dimethyl pentyl-4-phenylenediamino)-1,-3,5-triazine, D-raffinose pentahydrate, 2,2'-methylene bis(6-tert-butyl-4-methyl-phenol), 2,6-di-tert-butyl-4-(dimethylaminomethyl) phenol, 4-dodecylresorcinol and the like, as well as mixtures thereof.

When present, optional antioxidants may be present in any desired or effective amount. Exemplary ink compositions may include antioxidants in an amount of about 0 to about 0.5 weight %, based on a total weight of the ink vehicle, such as from about 0.001 to about 0.375 weight % or from about 0.01 to about 0.25 weight %.

In addition, uncured ink compositions of embodiments may have a viscosity in a range of from about $10^{3.5}$ to about $10^9$ centipoise at a temperature of about 60° C. or less. Exemplary ink compositions may have a viscosity in a range of from about 5 to about 15 centipoise at a temperature of about 70° C. or more.

Exemplary ink compositions can be prepared by any desired or suitable method. However, processes for preparing ink compositions may include heating to melt and dissolve one or more curable component that includes two reactive functionalities and one or more long aliphatic hydrocarbon chains in the same molecule; dissolving one or more optional initiating agent in the melted curable component, optionally adding one or more additives, gently agitating the solution, optionally combining one or more non-curable component into the melted mixture; optionally filtering the mixture; and cooling the mixture to yield a solid ink composition.

Exemplary processes may comprise incorporating an exemplary ink composition into an ink-jet printing apparatus, jetting the ink composition onto an intermediate substrate to form an intermediate image, optionally partially curing the intermediate image; transferring the intermediate image onto a substrate to form a transferred image, and fully curing the transferred image to radiation; wherein the ink composition comprises an ink vehicle comprising one or more curable component that includes two reactive functionalities and one or more long aliphatic hydrocarbon chains in the same molecule. Printing apparatuses may employ a piezoelectric printing process wherein droplets of the ink are caused to be ejected in imagewise pattern by oscillations of piezoelectric vibrating elements. Printing apparatuses may also employ an acoustic ink-jet process, wherein droplets of the ink are caused to be ejected in imagewise pattern by acoustic beams.

Droplets of melted ink may be caused to be ejected onto an intermediate-transfer member, followed by transfer of the image from the intermediate-transfer member to a recording sheet. An intermediate-transfer member may be heated to a temperature above that of a final recording sheet and below that of a melted ink in a printing apparatus. Exemplary ink compositions may also be employed in other hot-melt printing processes, such as hot-melt thermal ink-jet printing, hot-melt continuous-stream ink-jet printing, deflection ink-jet printing, or the like.

Any suitable substrate or recording sheet can be employed, including plain papers such as XEROX® 4024 papers, XEROX® Image Series papers, Courtland 4024 DP paper, ruled notebook paper, bond paper, silica-coated papers such as Sharp Company silica-coated paper, JuJo paper, and the like, transparency materials, fabrics, textile products, plastics, polymeric films, substrates such as metals and wood, and the like. Exemplary processes may entail printing onto a porous or ink-absorbent substrate, such as plain paper.

Specific examples are described in detail below. These examples are intended to be illustrative, and the materials, conditions, and process parameters set forth in these exemplary embodiments are not limiting. All parts and percentages are by weight unless otherwise indicated.

EXAMPLES

Examples 1-6

Exemplary Curable Ink Vehicle

Powdered dimer diol diacrylate, 2,2-bis(acryloylmethyl) propanoic stearyl ester, and UNILIN 350 acrylate (reactive wax phase change agent, derived from UNILIN 350, which is available from Baker Petrolite) are combined in the amounts set forth in Table 2 (below) and heated to a temperature of 100° C. to melt and combine. The melted mixtures are then filtered. These inks may be optionally cooled to room temperature to yield solid ink vehicles.

TABLE 2

|  | Example 1 (parts by weight) | Example 2 (parts by weight) | Example 3 (parts by weight) | Example 4 (parts by weight) | Example 5 (parts by weight) | Example 6 (parts by weight) |
| --- | --- | --- | --- | --- | --- | --- |
| Dimer diol diacrylate | 54.3 | 44.3 | 19.3 | — | 32.7 | 39.3 |
| 2,2-Bis(acryloylmethyl) propionic stearyl ester | — | 10 | 35 | 70.3 | 32.6 | — |
| UNILIN 350 acrylate | 15 | 25 | 10 | 10 | 6 | 35 |

Examples 7-12

Exemplary Ink Compositions

Carbon black (pigment black 7) and a polyisobutylene succinimide dispersant (ORONITE OLOA 11000, available from Chevron Oronite Company, LLC) are mixed together in a beaker in the amounts set forth in Table 3 (below) and heated to a temperature of 120° C.

The ink vehicles of Examples 1-6 are combined with stearyl acrylate, 1,6-hexanediol diacrylate, isobornyl acrylate, dipentaerithritol pentacrylate ester, 1,10-decanediol, an α-amino ketone photoinitiator (IRGACURE 379, available from Ciba Specialty Chemicals, Inc.), a wax-tethered photoinitiator, and an ultra-violet photoinitator (IRGASTAB UV 10, available from Ciba Specialty Chemicals, Inc.) are mixed together in the amounts set forth in Table 3 (below) and heated to a temperature of 100° C. with stirring. After 30 minutes of stirring at 100° C., the carbon black and polyisobutylene succinimide dispersant mixture is added, and the resulting mixture is stirred for another 30 minutes at 100° C. Dispersion of the pigment is assured using a Fisher Scientific Sonic Dismembrator Model 500 ultrasonic probe set at 100% amplitude and pulsing for three 1 minute cycles.

TABLE 3

|  | Example 7 (weight %) | Example 8 (weight %) | Example 9 (weight %) | Example 10 (weight %) | Example 11 (weight %) | Example 12 (weight %) |
|---|---|---|---|---|---|---|
| Example 1 | 69.3 | — | — | — | — | — |
| Example 2 | — | 79.3 | — | — | — | — |
| Example 3 | — | — | 64.3 | — | — | — |
| Example 4 | — | — | — | 80.3 | — | — |
| Example 5 | — | — | — | — | 71.3 | — |
| Example 6 | — | — | — | — | — | 74.3 |
| Propoxylated neopentyl glycol diacrylate | 20 | 10 | 15 | | | |
| Stearyl acrylate | — | — | 5 | — | 10 | 5 |
| 1,6-Hexanediol diacrylate | — | — | — | — | 5 | — |
| Isobornyl acrylate | — | — | 5 | 6 | — | — |
| Dipentaerithritol pentacrylate ester | — | — | — | 3 | 3 | — |
| 1,10-Decanediol | — | — | — | — | — | 10 |
| IRGACURE 379 | 2 | 2 | 2 | 2 | 2 | 2 |
| Wax-tethered initiator | 4 | 4 | 4 | 4 | 4 | 4 |
| IRGASTAB UV 10 | 0.2 | 0.2 | 0.2 | 0.2 | 0.2 | 0.2 |
| Pigment Black 7 | 2.5 | 2.5 | 2.5 | 2.5 | 2.5 | 2.5 |
| ORONITE OLOA 11000 | 2.0 | 2.0 | 2.0 | 2.0 | 2.0 | 2.0 |

It will be appreciated that various of the above-discussed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An ink composition comprising a homogeneous ink vehicle that comprises one or more curable components, wherein the one or more curable components comprise molecules with two reactive functional groups and a single linear aliphatic hydrocarbon side chain comprised of from about 20 to about 45 carbon atoms, and wherein the one or more curable components are present in amounts in a range of from about 20 to about 95 weight %, based on the total weight of the ink vehicle.

2. The ink composition according to claim 1, wherein the one or more curable components are curable by radiation having wavelengths in a range of from about 200 to about 500 nanometers.

3. The ink composition according to claim 1, wherein the ink vehicle further comprises one or more non-curable components.

4. The ink composition according to claim 3, wherein the one or more non-curable components are one or more compounds selected from waxy diols, paraffins, microcrystalline waxes, polyethylene waxes, ester waxes, fatty acids, fatty amide-containing materials, sulfonamide materials, isocyanate-derived resins and waxes, tall oil rosins, rosin esters, and mixtures thereof.

5. The ink composition according to claim 3, wherein the one or more non-curable components are present in amounts in a range of from about 5 to about 15 weight %, based on the total weight of the ink vehicle.

6. The ink composition according to claim 1, further comprising one or more additives.

7. The ink composition according to claim 6, wherein the one or more additives comprise one or more additives selected from the group consisting of dispersants and/or surfactants, conductivity enhancing agents, tackifiers, adhesives, plasticizers, nonpolymeric organic gelator additives, viscosity modifiers, clarifiers, defoamers, antifoamers, leveling agents, additives for roll release and lubricity, and mixtures thereof.

8. An ink composition comprising a homogeneous ink vehicle that comprises one or more curable components and one or more initiating agents, wherein the one or more curable components comprise molecules with two reactive functional groups and a single linear aliphatic hydrocarbon side chain comprised of from about 20 to about 45 carbon atoms.

9. The ink composition according to claim 8, wherein the one or more initiating agents are present in amounts in a range of from 1 to about 10 weight %, based on the total weight of the ink vehicle.

10. The ink composition according to claim 8, wherein the one or more initiating agents is selected from photoinitiator compounds.

11. An ink composition comprising a homogeneous ink vehicle that comprises one or more curable components and one or more colorants, wherein the one or more curable components comprise molecules with two reactive functional groups and a single linear aliphatic hydrocarbon side chain comprised of from about 20 to about 45 carbon atoms.

12. The ink composition according to claim 11, wherein the one or more colorants comprise one or more coloring agents selected from the group consisting of dyes, mixtures of dyes, pigments, mixtures of pigments, and mixtures of dyes and pigments.

13. The ink composition according to claim 11, wherein the one or more colorants are present in amounts in a range of from about 0.1 to about 15 weight %, based on the total weight of the ink composition.

14. An ink composition comprising a homogeneous ink vehicle that comprises one or more curable components, wherein the one or more curable components comprise molecules with two reactive functional groups and a single linear aliphatic hydrocarbon side chain comprised of from about 20 to about 45 carbon atoms, and wherein the one or more curable components is an $AB_2$ diacrylate.

15. A method for preparing an ink composition, comprising:
heating to melt and dissolve one or more curable components, wherein the one or more curable components comprise molecules with two reactive functional groups and a single linear aliphatic hydrocarbon side chain comprised of from about 20 to about 45 carbon atoms; and
cooling to yield a solid ink composition.

16. The method according to claim 15, further comprising dissolving one or more components selected from initiating agents and colorants in the melted curable component.

17. The method according to claim 15, further comprising dissolving one or more non-curable components in the melted curable component.

18. The method according to claim 15, further comprising dissolving one or more additives in the melted curable component.

* * * * *